(12) United States Patent
Herdrich et al.

(10) Patent No.: US 9,769,050 B2
(45) Date of Patent: Sep. 19, 2017

(54) END-TO-END DATACENTER PERFORMANCE CONTROL

(71) Applicants: Andrew J. Herdrich, Hillsboro, OR (US); Patrick Connor, Beaverton, OR (US); Dinesh Kumar, Beaverton, OR (US); Alexander W. Min, Portland, OR (US); Ravishankar Iyer, Portland, OR (US); Daniel J. Dahle, Willsonville, OR (US); Kapil Sood, Beaverton, OR (US); Jeffrey B. Shaw, Tempe, AZ (US)

(72) Inventors: Andrew J. Herdrich, Hillsboro, OR (US); Patrick Connor, Beaverton, OR (US); Dinesh Kumar, Beaverton, OR (US); Alexander W. Min, Portland, OR (US); Ravishankar Iyer, Portland, OR (US); Daniel J. Dahle, Willsonville, OR (US); Kapil Sood, Beaverton, OR (US); Jeffrey B. Shaw, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 14/581,595

(22) Filed: Dec. 23, 2014

(65) Prior Publication Data

US 2016/0182345 A1 Jun. 23, 2016

(51) Int. Cl.
*G06F 15/173* (2006.01)
*H04L 12/26* (2006.01)
(Continued)

(52) U.S. Cl.
CPC ............ *H04L 43/50* (2013.01); *G06F 12/084* (2013.01); *H04L 41/0896* (2013.01);
(Continued)

(58) Field of Classification Search
CPC .................................................. H04L 12/2602
(Continued)

(56) References Cited

U.S. PATENT DOCUMENTS 8,190,930 B2 5/2012 Herdrich et al.
8,645,728 B2 2/2014 Herdrich et al.
(Continued)

FOREIGN PATENT DOCUMENTS

| JP | 2005530260 A | 10/2005 |
| JP | 2007048315 A | 2/2007 |
| WO | WO 02/089014 A1 | 7/2002 |

OTHER PUBLICATIONS

Herdrich et al., "Techniques to Dynamically Allocate Resources of Configurable Computing Resources," U.S. Appl. No. 14/627,912, filed Feb. 20, 2015, 62 pages.
(Continued)

*Primary Examiner* — Kyung H Shin
(74) *Attorney, Agent, or Firm* — Schwabe, Williamson & Wyatt, P.C.

(57) ABSTRACT

In embodiments, apparatuses, methods and storage media (transitory and non-transitory) are described that are associated with end-to-end datacenter performance control. In various embodiments, an apparatus for computing may receive a datacenter performance target, determine an end-to-end datacenter performance level based at least in part on quality of service data collected from a plurality of nodes, and send a mitigation command based at least in part on a result of a comparison of the end-to-end datacenter performance level determined to the datacenter performance target. In various embodiments, the apparatus for computing may include one or more processors, a memory, a datacenter performance monitor to receive a datacenter performance target corresponding to a service level agreement, and a mitigation module to send a mitigation command based at
(Continued)

least in part on a result of a comparison of an end-to-end datacenter performance level to a datacenter performance target.

25 Claims, 8 Drawing Sheets

(51) Int. Cl.
*H04L 12/24* (2006.01)
*G06F 12/084* (2016.01)
*G06F 12/0811* (2016.01)

(52) U.S. Cl.
CPC ...... *H04L 41/5009* (2013.01); *H04L 41/5025* (2013.01); *H04L 41/5035* (2013.01); *H04L 43/16* (2013.01); *G06F 12/0811* (2013.01); *G06F 2212/152* (2013.01); *G06F 2212/601* (2013.01); *H04L 41/5096* (2013.01)

(58) Field of Classification Search
USPC ........................................................ 709/224
See application file for complete search history.

(56) References Cited

U.S. PATENT DOCUMENTS

| 8,738,942 | B2 | 5/2014 | Herdrich et al. |
| 8,775,834 | B2 | 7/2014 | Herdrich et al. |
| 8,924,748 | B2 | 12/2014 | Herdrich et al. |
| 9,218,046 | B2 | 12/2015 | Herdrich et al. |
| 9,235,256 | B2 | 1/2016 | Herdrich et al. |
| 2009/0222553 | A1* | 9/2009 | Qian .................. H04L 12/2602 709/224 |
| 2014/0095691 | A1 | 4/2014 | Ganguli et al. |
| 2001/5026390 | | 9/2015 | Kasturi et al. |
| 2016/0077844 | A1 | 3/2016 | Herdrich et al. |

OTHER PUBLICATIONS

Intel Corporation, "Intel 64 and IA-32 Architectures Software Developer's Manual", vol. 3B: System Programming Guide, Part 2, Apr. 2016, 576 pages.
Extended European Search Report mailed May 18, 2016 for European Application No. 15195504.4, 8 pages.
Office Action dated Nov. 28, 2016 from Korean Patent Application No. 2015-0163021, 11 pages.
Office Action dated Dec. 6, 2016 from Japanese Patent Application No. 2015-219437, 4 pages.
Office Action dated May 4, 2017 from Korean Patent Application No. 2015-0163021, 5 pages.

\* cited by examiner

END-TO-END DATACENTER PERFORMANCE CONTROL

TECHNICAL FIELD

The present disclosure relates to the field of data processing, in particular, to end-to-end datacenter performance control based at least in part on quality of service data collected for a plurality of nodes.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Datacenters are becoming increasingly consolidated which introduces a number of challenges in managing application performance. In a consolidated environment with a number of applications co-running on any given platform or in virtualized environments such as those using software defined networking or network function virtualization, it can be difficult to predict and control the performance that a given thread will see using previously existing methods and technology. As server consolidation increases and virtual machine (VM) counts increase, sources of contention within the datacenter increase. These sources of contention may include contention between threads within a core, between threads on an level 2 (L2) cache, between threads for offcore bandwidth, between threads for interconnect bandwidth, between threads, accelerators, and input/output (JO) for level 3 (L3) cache space and bandwidth, between threads and accelerators for IO bandwidth, and between competing applications and flows over a network. These combined sources of contention increase the difficulty of performance prediction for a given workflow. This can have serious consequences when an end-user's view of an application is considered such as the response time of a smartphone application that communicates with a cloud services backend infrastructure. Additionally, the combined sources of contention can also cause substantial delay in the delivery of a webpage to a user, and can affect the perceived performance of cloud service offerings in general within the datacenter such as cloud-to-cloud compute deployments, for example.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
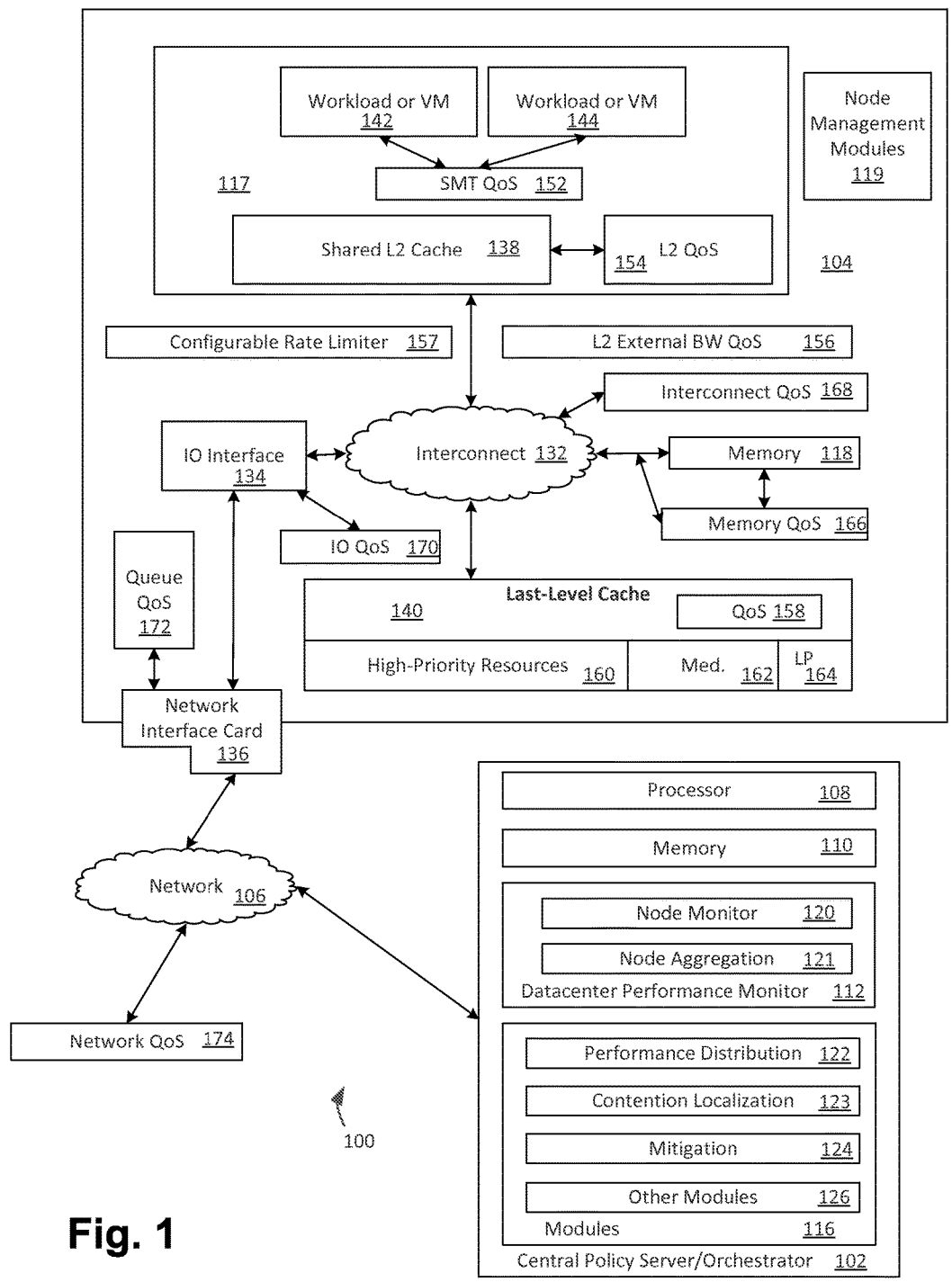
FIG. 1 is a block diagram of an apparatus for computing in an operating environment, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a computing device. As used herein, the term "processor" may be a processor core.

Referring now to FIG. 1, an apparatus for computing 100, incorporated with the end-to-end datacenter performance control teaching of the present disclosure, in accordance with various embodiments, is illustrated. As shown, apparatus 100 may include a number of components 102-174, including a central policy server 102 (also referred to as orchestrator) and a plurality of platform nodes 104, configured to cooperate with each other over a network 106, to provide computing through platform nodes 104, under the control/orchestration of central policy server 102. In embodiments, central policy server 102 may be configured to monitor datacenter performance in accordance with service level agreements (SLAs) to detect sources of contention between workloads executed on platform nodes 104 and mitigate them using quality of service (QoS) monitoring and enforcement hardware instrumentations selectively disposed on platform nodes 104. The nodes 104 may be rack-mounted server systems, in various embodiments. The QoS monitoring and enforcement hardware instrumentations may include mechanisms provided by on-die or off-die QoS hardware instrumentations to prioritize traffic. In embodiments, the QoS hardware instrumentations may include a last-level cache QoS hardware instrumentation 158 that may include cache occupancy monitoring hardware, cache miss monitoring counters, and control over where data is filled into the cache (e.g., via statistical limits, or hard capacity limits). QoS monitoring mechanisms provided by the QoS hardware instrumentations may provide QoS monitoring data related to the use of various system resources by competing traffic flows in various embodiments. QoS enforcement mechanisms provided by the QoS instrumentations may provide for allocation of system resources among competing traffic flows in embodiments.

In embodiments, central policy server 102 may include one or more processors or processor cores 108, system memory 110, a datacenter performance monitor 112, and modules 116 operated by the one or more processors 108 that may be coupled together and configured to cooperate with each other. In embodiments, part or all of the datacenter performance monitor 112 may be included as a part of the modules 116. The platform nodes 104 may include one or more processors or processor cores 117, memory 118, and node management modules 119 operated by the one or more processors 117 that may be coupled together and configured to cooperate with each other. For purposes of this application, including the claims, the terms "processor" and "processor cores" may be considered synonymous, unless the context clearly requires otherwise. In embodiments, controls relating to multiple types of QoS instrumentations associated with a plurality of platform elements may be coordinated by the central policy server 102 acting as an orchestrator to monitor performance targets in relation to actual performance of workloads, flows, tasks, or virtual machines and to modulate the QoS instrumentation controls to maintain performance requirements of the workloads, flows, or tasks within the system in accordance with service level agreements (SLAs). The SLAs may take the form of a performance target in operations/second, a user-defined metric, a response time (latency), or other performance measures in various embodiments. In embodiments, the SLAs may be managed based at least in part on performance targets passed down from datacenter administrators or management software.

Performance below a target established by an SLA may take such forms as greater latency (e.g., 400 ms rather than a target of 150 ms) or fewer operations/second (e.g., 30,000 operations/second rather than a target of 50,000 operations/second) and performance above a target may take such forms as lower latency (e.g., 100 ms rather than a target of 150 ms) or more operations/second (e.g., 75,000 operations/second rather than a target of 50,000 operations/second), in various embodiments. The QoS instrumentations may be used by the central policy server 102 to tune the performance of workloads by increasing or decreasing parameters such as cache space and processor cores associated with threads or workloads to raise or lower a performance level of the thread or workload and bring its performance level closer to a target associated with the thread or workload. In embodiments, cache space may be redistributed among threads or workloads for a single cache level, a combination of cache levels, or all cache levels. In embodiments, a high priority workload may be given additional resources, or all remaining resources by tuning with QoS instrumentations when lower priority workloads have met their corresponding performance target such that the high priority workload receives increased performance even if it exceeds its corresponding SLA. In embodiments, by tuning with QoS instrumentations, lower priority workloads having a low or medium priority level may be provided with a performance level corresponding to only a guaranteed minimum level of service in accordance with their associated SLA such that higher priority workloads or instances may be run as fast as possible. In embodiments, the central policy server 102 may provide additional resources or rebalance workloads and resources when performance targets are met in order to increase performance levels such as throughput. In embodiments, this may occur as an optimization or performance maximization process even if some or all running workloads, threads, or instances are meeting their respective performance targets.

In embodiments, QoS hardware instrumentations for monitoring or enforcement may include but are not limited to on die platform QoS (PQoS) mechanisms which may allow a hypervisor to monitor last-level cache usage at application and virtual machine levels, as well as simultaneous multithreading (SMT) QoS, cache QoS, and memory QoS that may be used to monitor traffic flow resource utilization and prioritize traffic. In various embodiments, QoS hardware instrumentations for monitoring and enforcement may include but are not limited to off die mechanisms such as peripheral component interconnect express (PCIe) QoS, Ethernet QoS, long-term evolution (LTE) QoS, evolved node B (eNB) QoS, Intel® QuickPath Interconnect (QPI) QoS, Keizer Technology Interface (KTI) QoS, Internet Protocol version 6 (IPv6) QoS, Intel® On-Chip System Fabric (IOSF) QoS, transmission control protocol (TCP) QoS, datacenter bridging (DCB) QoS, and many other technologies to monitor and enforce QoS at the network interface card (NIC)/switch/network level. In various embodiments, some or all QoS or PQoS hardware instrumentations may provide one of or both monitoring and enforcement capability, such as by providing QoS monitoring data when read or by providing for allocation of resources as an enforcement mechanism when writing to a register of a QoS hardware instrumentation or passing particular data to the QoS instrumentation. In embodiments, PQoS hardware instrumentations may include L3 cache monitoring and L3 cache enforcement, reallocation, and redistribution capabilities.

Generally, in embodiments, a software agent, that may be included in the node management modules 119, may be configured to run on each node 104 to monitor the local node system, provide telemetry including QoS data to the central policy server 102 that may be acting as a datacenter orchestrator, and enforce policies, commands, or instructions received from the central policy server 102. The node management modules 119 may include QoS monitoring and enforcement instrumentation enumeration modules, a contention localization module, a mitigation module, and data receiving and reporting modules. In various embodiments, the central policy server 102 may act as a datacenter orchestrator to examine workloads, performance targets, workload-node mappings, and levels of resource contention to make resource allocation determinations (such as how much cache to give to a web server VM or how much memory bandwidth to reserve for a firewall VM), and these determinations are passed down to the nodes 104 running these applications for enforcement. The central policy server 102 may generate and store plots, performance data, and telemetry based on datacenter performance levels and QoS monitoring and enforcement data for use by system administrators or users. The central policy server 102 may maintain a global view of the datacenter including resources available vs. in use, applications, flows, VMs, and workloads in use, end-to-end performance targets, and performance budgets for each part of a flow, and may use this information to make datacenter-level and node-level resource allocation optimizations (e.g., allocate more L3 cache to a workload on a node in the middle of a flow which is cache-sensitive and is performing below the expected performance level). In embodiments, the central policy server 102 may also store performance data tables (e.g., as row×column format or key-value format).

In various embodiments, the datacenter performance monitor 112 may include a node monitor 120 to monitor performance levels of the plurality of nodes and a node aggregation module 121 operated by the one or more processors 108 to aggregate the performance levels of the plurality of nodes to determine an aggregated performance level. In embodiments, the modules 116 may include a performance distribution module 122 to determine a node performance target for each of the plurality of nodes based at least in part on the datacenter performance target, a contention localization module 123 to send a contention localization command and receive a contention localization response, a mitigation module 124 to send a mitigation command based at least in part on the contention localization response, and one or more other modules 126. In embodiments, the contention localization module 123 may periodically receive data from nodes 104 relating to contention for various resources based on QoS hardware monitoring instrumentations without first sending a contention localization command, and the mitigation module 124 may send a mitigation command based at least in part on this periodically received data. In embodiments, the mitigation command may include a mitigation command selected from a group of mitigation commands that includes an instruction to provide additional memory, an instruction to provide an additional processor core, an instruction to provide additional network bandwidth, an instruction to provide additional memory bandwidth, an instruction to provide additional IO bandwidth to an underserved device, an instruction to provide additional per-thread resources using SMT QoS, and an instruction to provide additional cache space to a workload. In embodiments, a decision of which mitigation commands to issue may be based at least in part on actions performed by at least one modules 122-124 and 126. In embodiments where tuning to decrease performance of a workload is performed, the mitigation command may include a mitigation command selected from a group of mitigation commands that includes an instruction to provide less memory, an instruction to remove a processor core, an instruction to provide less network bandwidth, an instruction to provide less memory bandwidth, an instruction to provide less IO bandwidth to an overserved device, an instruction to provide less per-thread resources using SMT QoS, and an instruction to provide less cache space to a workload. The mitigation command may also include an instruction to use another QoS enforcement mechanism in various embodiments.

In embodiments, one or more platform nodes 104 may include an interconnect 132 to allow memory, cache, storage, and interfaces to communicate with the one or more processors 117. Nodes 104 may include an input/output (IO) interface 134 in data communication with a network interface card (NIC) 136 in various embodiments to facilitate communication between the nodes 104 and the central policy server 102 over the network 106. In embodiments, each node 104 may also include one or more cache resources such as a shared L2 Cache 138 and a last-level cache 140, such as an L3 cache, for example. In embodiments, each node 104 may also include one or more other levels of caches (e.g., L1, L4, etc.). One or more workloads or virtual machines such as a first workload 142 and a second workload 144 may be operated by the one or more processors 117.

In embodiments, the nodes 104 may include a number of mechanisms or hardware hooks to monitor and enforce quality of service levels, including a simultaneous multithreading (SMT) QoS hardware instrumentation 152 to address performance concerns between threads within a processor core, a L2 QoS hardware instrumentation 154 to address performance concerns between threads on the shared L2 cache 138, a L2 external bandwidth QoS hardware instrumentation 156 that may work in conjunction with a configurable rate limiter 157 to address performance concerns between threads for offcore bandwidth, and the last-level cache QoS hardware instrumentation 158 to address performance concerns between threads for last-level cache resources. In embodiments, the last level cache QoS hardware instrumentation 158 may provide mechanisms to monitor and enforce allocation of the last-level cache 140 to threads associated with workloads such as the first workload 142 and the second workload 144 in a manner such that high priority workloads 160 receive a greater proportion of last-level cache 140 resources than medium priority workloads 162 which in turn receive a greater proportion of last-level cache 140 resources than low priority workloads 164. In embodiments, resources of the last-level cache 140 may be categorized into more or fewer levels of priority. The last-level cache QoS hardware instrumentation 158 may be used to address performance concerns between threads, accelerators, and IO operations for last-level cache 140 space and bandwidth in various embodiments. The central policy server 102 may be able to query each node 104 to determine the hardware support capabilities on each node, such as which QoS hardware instrumentations are available for use on any given node. The node 104 may enumerate the available QoS hardware instrumentations in response to the query and send a reply, including data corresponding to the QoS hardware instrumentations back to the central policy server 102. This data may be used by the central policy server 102 in determining which mitigation commands are sent to which nodes, in various embodiments. A datacenter may include a heterogenous fleet of nodes 104 of varying ages and hardware capabilities that are simultaneously deployed. In such heterogenous environments, commands sent to the nodes from the central policy server 102 may vary from node to node based at least in part on the hardware capabilities available on any given node.

The apparatus 100 may also include a memory QoS hardware instrumentation 166 associated with the memory 118 and an interface between the memory 118 and the interconnect 132, an interconnect QoS hardware instrumentation 168 associated with the interconnect 132 to address performance concerns between threads for interconnect bandwidth, an IO QoS hardware instrumentation 170 associated with the IO interface 134 to address performance concerns between threads and accelerators for IO bandwidth as well as between competing applications and flows over the network 106, a queue based QoS hardware instrumentation 172 associated with the NIC 136, and a network QoS hardware instrumentation 174 associated with the network 106 in embodiments. PQoS may include one or more of the QoS hardware instrumentation monitoring or enforcement capabilities as well as other QoS hardware instrumentations in various embodiments.

Figure 2:
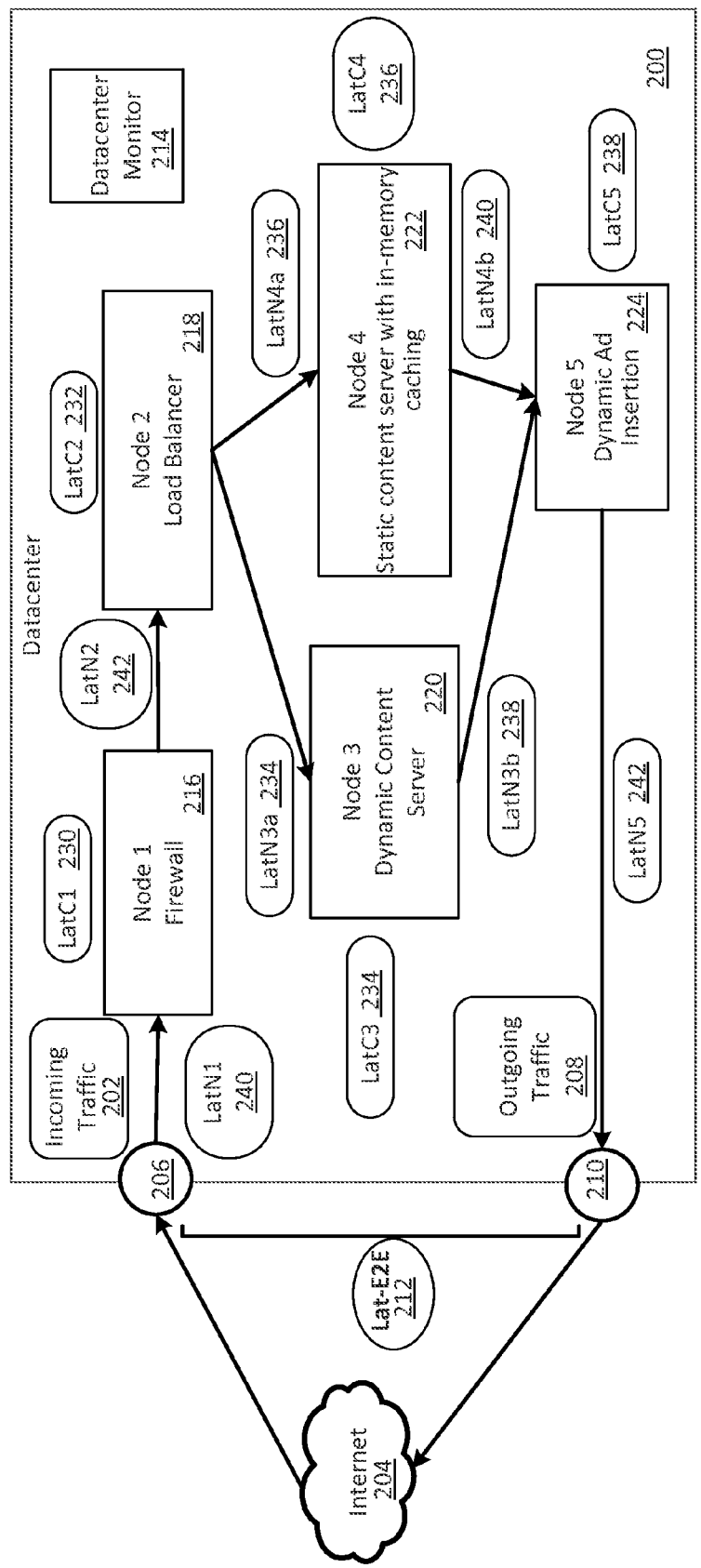
FIG. 2 is a block diagram of a datacenter, in accordance with various embodiments.

Referring now to FIG. 2, a block diagram of a datacenter 200, incorporated with the end-to-end datacenter performance control teaching of the present disclosure, in accordance with various embodiments, is illustrated. Incoming data traffic 202, for the embodiments, may enter the datacenter 200 from public internet 204 through an ingress point that may be a first network interface 206. Outgoing data traffic 208 may leave the datacenter 200 at an egress point that may be a second network interface 210 in embodiments. An end-to-end datacenter latency (Lat-E2E) 212 may be measured from the ingress to egress points. A datacenter monitor 214 that may be an orchestrator such as the central policy server 102 described with respect to FIG. 1 may monitor a plurality of nodes that service the data traffic in various embodiments. In an example configuration, the datacenter 200 may include a first node 216, such as a firewall, a second node 218, such as a load balancer, a third node 220, such as a dynamic content server, a fourth node 222, such as a static content server with in-memory caching, and a fifth node 224, such as a server providing dynamic ad insertion. Each of the nodes 216-224 may include components such as those described with respect to the node 104 in various embodiments. Together, these nodes 216, 218, 220, 222, and 224 along with the datacenter monitor 214 may cooperate with each other to enable datacenter monitor 214 to monitor and enforce the datacenter 200 performance levels such as Lat-E2E 212 to meet datacenter performance targets for workloads corresponding to various SLAs.

The end-to-end datacenter latency Lat-E2E 212, or total data center latency may be calculated as the sum of all network and compute latencies:

TotalDatacenterLatency=ΣNetworkLatencies+ ΣComputeLatencies

Although not reflected in the equation above, calculation of total data center latency would account for parallel operations by using the maximum latency between parallel operations rather than summing all parallel latencies.

With respect to the datacenter 200 shown in FIG. 2, the network latencies are shown as LatN*, and the compute latencies are shown as LatC*. As shown, the network latencies include a first network latency LatN1 240 between the first network interface 206 and the first node 216, a second network latency LatN2 242 between the first node 216 and the second node 218, a network latency associated with traffic entering the third node 220 shown as LatN3$a$ 234, a network latency associated with traffic entering the fourth node 222 shown as LatN4$a$ 236, a network latency associated with traffic leaving the third node 220 shown as LatN3$b$ 238, a network latency associated with traffic leaving the fourth node 222 shown as LatN4$b$ 240, and a network latency between the fifth node 224 and the second network interface 210 shown as LatN5 242. Compute latencies associated with each node are also shown, with LatC1 230, LatC2 232, LatC3 234, LatC4 236, and LatC5 238 corresponding to the first node 216 through the fifth node 224, respectively. As applied to the latencies shown in FIG. 2, Lat-E2E 212 may be described as:

$$TotalDatacenterLatency = \sum_z LatNz + \sum_x LatCx$$

With respect to FIG. 2, for ease of understanding, the above equation is somewhat simplified in that it does not explicitly account for the possibility that the operations performed by the third node 220 and the fourth node 222 may be performed in parallel or that only one of them may be performed for some flows. In calculating end-to-end datacenter performance, in embodiments, a maximum latency between the second node 218 and the fifth node 224 (max([LatN3$a$+LatC3+LatN3$b$], [LatN4$a$+LatC4+LatN4$b$])) may be used for any given flow rather than summing all latencies associated with the third node 220 and the fourth node 222. By viewing end-to-end datacenter performance in this manner, end-to-end datacenter performance targets may be quantified, broken down, and attributed to individual agents in the datacenter service chain. In embodiments, the datacenter monitor 214 may break down performance targets such as latencies into compute budgets per node, which in turn may drive resource assignments and allocations. The datacenter monitor 214 may also break down performance targets such as latencies into per-network segment budgets relating to a network latency over each network segment. An example network segment may be the path shown between the first node 216 and the second node 218, with the nodes at each end of the path (nodes 216, 218) being associated with the network segment. In embodiments, the datacenter monitor 214 in cooperation with one or more of the nodes associated with a network segment may use QoS monitoring or enforcement hardware instrumentations to monitor or enforce network segment budgets relating to network segments with which they are associated. In embodiments, the performance distribution module 122 may be used in these processes of breaking down performance targets such as latencies into compute budgets per node and/or per-network segment network latency budgets.

An example, by way of illustration, relating to FIG. 2, is to meet a SLA that requires an end-to-end datacenter latency of 250 milliseconds (ms) for a web hosting flow. This would result in an end-to-end datacenter performance target of 250 ms for Lat-E2E 212. If the first node 216 (firewall), second node 218 (load balancer), and fifth node 224 (dynamic ad insertion) each require 10 ms in combined compute and network latencies, this leaves 220 ms in combined compute and network latencies for the third node 220 (dynamic content server) and fourth node 222 (static content server) to deliver their results for this example web hosting flow. Requirements relating to other active flows in the datacenter 200 such as lower-SLA websites (e.g., 500 ms), or voice-over-IP (VoIP) audio traffic which may require a 10 ms response time or less may also be considered by the datacenter monitor 214 in determining resource allocation within the datacenter 200 with respect to resources such as cache space, network bandwidth, latency, and memory bandwidth, as well as thread, core, and socket scheduling. The end-to-end datacenter performance target, combined with workload priorities, workload cache, memory, compute and IO sensitivity, and QoS monitoring data may be combined by the datacenter monitor 214 to determine resource allocations for the individual workloads on nodes.

Figure 3:
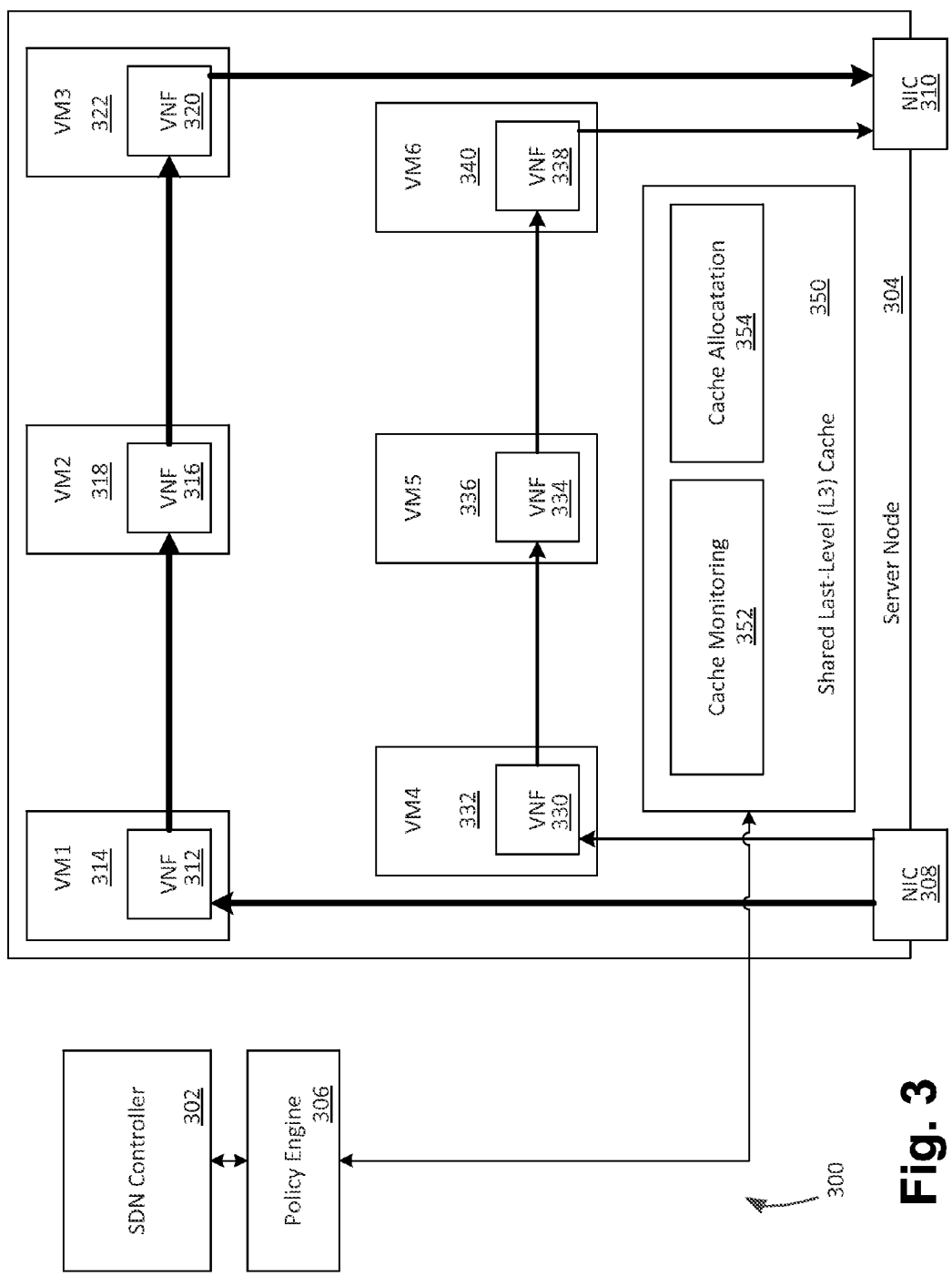
FIG. 3 is a block diagram of a network functions virtualization system, in accordance with various embodiments.

Referring now to FIG. 3, a block diagram of a network functions virtualization (NFV) system 300 incorporated with the end-to-end datacenter performance control teaching of the present disclosure, in accordance with various embodiments is shown. The NFV environment may include a software defined networking (SDN) controller 302 that may include some or all of the functionality and components described with respect to the datacenter monitor 214 or the central policy server 102 in embodiments. The SDN controller 302 may be in data communication with a server node 304 that may include some or all of the functionality and components described with respect to nodes 104, 216, 218, 220, 222, or 224 in various embodiments. A plurality of server nodes 304 may be in data communication with the SDN controller 302 in embodiments. The NFV environment 300 may also include a policy engine 306 configured to cooperate with the SDN controller 302 to distribute and enforce policies to one or more server nodes 304. In embodiments, the SDN controller 302 and the policy engine 306 may be included in a single computing device or may be distributed among a plurality of computing devices. The server node 304 may include a first NIC 308 for incoming data traffic and a second NIC 310 for outgoing data traffic.

Two flows, a high priority flow and a low priority flow are shown traversing the server node 304. The high priority flow may enter through the NIC 308 then passes to a first virtualized network function (VNF) 312 running on a first virtual machine (VM) 314 then to a second VNF 316 running on a second VM 318, then to a third VNF 320 running on a third VM 322 before passing to the second NIC 310. In similar fashion, a lower priority flow is shown to enter e.g., through the NIC 308, pass to a fourth VNF 330 running fourth VM 332, then to a fifth VNF running on a fifth VM 336, then to a sixth VNF 338 running on a sixth VM 340 before passing to the second NIC 310. Although they are shown as distinct in FIG. 3, some or all of the VMs or VNFs may be the same in various embodiments, and differing numbers of VMs or VNFs may be used.

The server node 304 may monitor the flows running through the node and send telemetry, including QoS monitoring data, relating to resource utilization and performance levels such as response time, network and memory bandwidth utilization, and resource use such as cache occupancy levels to the SDN controller 302. The server node 304 may monitor the flows using QoS mechanisms such as the instrumentations described with respect to FIG. 1 in various embodiments. The SDN controller 302 may monitor performance levels based at least in part on the telemetry received from the server node 304 in comparison to performance targets in various embodiments. If the targets are not met by the performance levels, the SDN controller 302 may command the server node 304 to make resource allocation changes to meet performance requirements. The resource allocation changes may include such parameters as allocating more shared cache to a performance deficient application, allocating more memory bandwidth, one or more additional cores, or additional network bandwidth using hardware QoS instrumentations such as those described with respect to FIG. 1. In embodiments, the resource allocation changes may be based at least in part on detecting sources of contention, such as may be provided by the contention localization module 124, for example.

Figure 4:
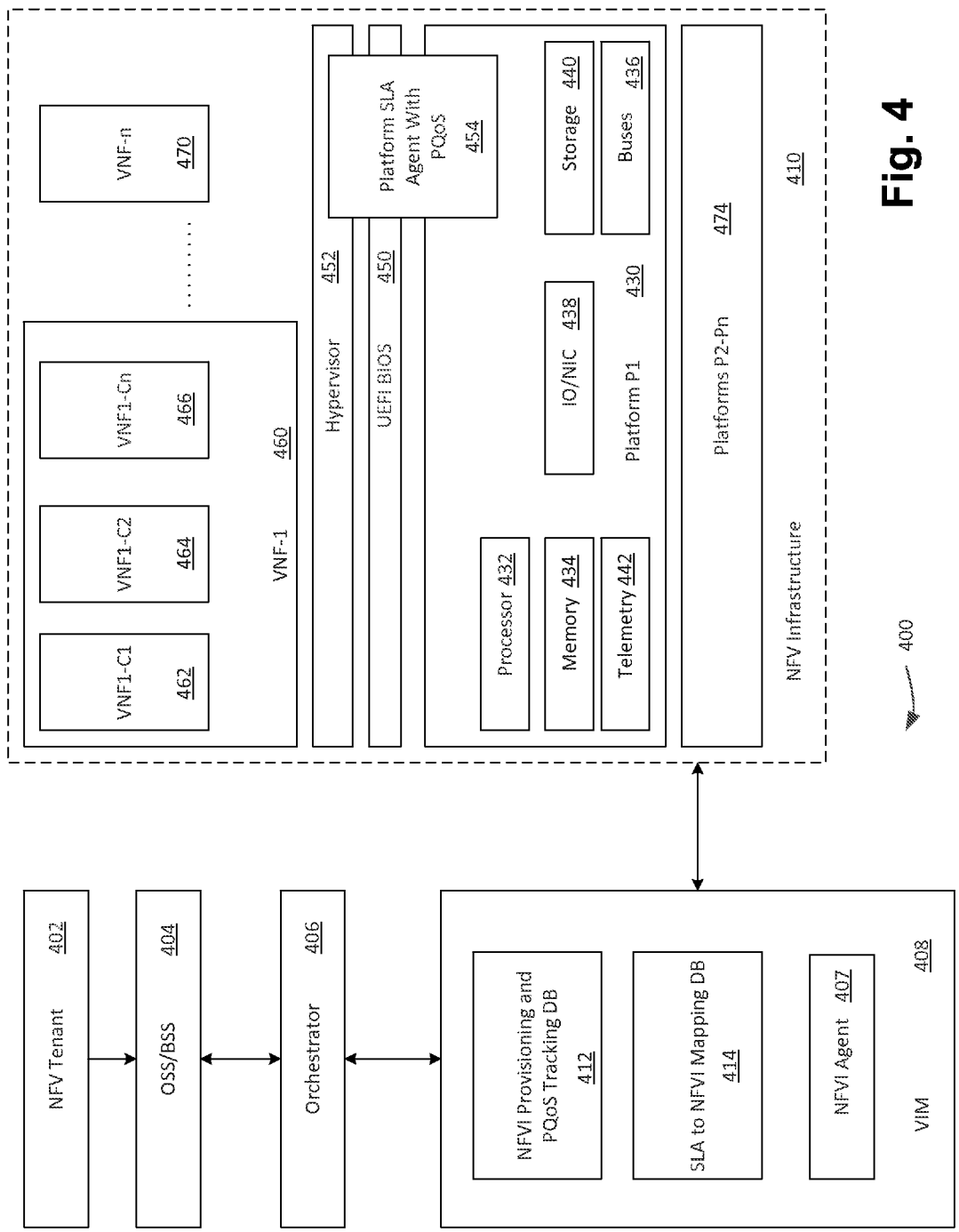
FIG. 4 is a block diagram of a network functions virtualization service level agreement monitoring system, in accordance with various embodiments.

FIG. 4 is a block diagram of a network functions virtualization (NFV) service level agreement (SLA) monitoring system 400, incorporated with the end-to-end datacenter performance control teaching of the present disclosure, in accordance with various embodiments. In embodiments, an NFV tenant 402 such as a service provider or cloud tenant may communicate with an operation support system/business support system (OSS/BSS) 404 such as a billing or customer care system to purchase a desired SLA on services. These services may be monitored and audited by the tenant 402 for SLA adherence. In embodiments, the OSS/BSS 404 provides the SLA request to a virtual infrastructure orchestrator 406.

The orchestrator 406 may include an SLA controller among other capabilities. The SLA controller may translate a high level SLA into a system level set of SLA requirements, with a platform quality of service PQoS being one example of many possible requirements. The orchestrator 406 may deliver the system SLA requirements to a network functions virtualization infrastructure (NFVI) agent 407 running on a virtual infrastructure manager (VIM) 408. The orchestrator 406 may also include policy management, audit, and reporting capabilities in various embodiments.

The VIM 408 may include the NFVI agent 407 which gathers PQoS data from across a plurality of platforms such as platform 430 and platforms 474 in a NFVI 410. The NFVI may be a broad system framework such as that described by an European Telecommunications Standards Institute (ETSI) NFV standard such as ETSI GS NFV 002 v1.1.1 (October, 2013). The VIM 408 may include a NFVI provisioning and PQoS tracking database (DB) 412 used by the NFVI Agent 407 in tracking PQoS data in various embodiments. The VIM 408 may also include an SLA to NFVI mapping DB 414 used by the NFVI Agent 407 in mapping SLAs to workloads and VNFs on the NFVI 410. Workloads performed in the NFVI 410 may be relatively long-lived compared to those in a traditional datacenter, allowing PQoS to be monitored and enforced in an active or passive mode, in various embodiments. Shorter lived, fast or transient workloads may be subject to classes of service that may be monitored and enforced by the orchestrator 406 and VIM 408 so that when a job workflow having a similar workload runs at a later time, it may be given appropriate per-platform resource allocations (e.g., cache space, memory) to meet performance targets.

Each platform may include one or more processors 432, memory 434, buses 436 such as a double data rate (DDR) or peripheral component interconnect express (PCIe) bus, IO/NIC components 438, storage devices 440, and telemetry instrumentations 442 such as the QoS instrumentations described with respect to FIG. 1 coupled together and arranged to cooperate with each other. The platforms 430, 474 may be based on an Intel® Xeon® DP platform, such as one using a Xeon® E5-2600 v3 processor, in embodiments. The NFVI agent 407 also may map available PQoS with desired PQoS in accordance with SLAs and perform mitigation if needed to meet the SLAs. PQoS may include some or all of the QoS hardware instrumentations described with respect to FIG. 1 or other QoS instrumentations in various embodiments. In embodiments, the NFVI agent 407 may provision, install, configure, and migrate VNFs or workloads across the NFVI 410 to achieve a desired PQoS in accordance with SLAs. A basic input/output system (BIOS) such as a unified extensible firmware interface (UEFI) BIOS 450 may run on some or all of platforms 430, 474. Additionally, a hypervisor 452 or virtual machine monitor (VMM) may run VNFs or VMs on some or all of platforms 430, 474. An operating system (OS) or cloud OS may run on some or all of the platforms 430, 474 in various embodiments.

In embodiments, the platforms 430, 474 may run one or more VNFs such as VNF-1 460 through VNF-n 470 that may include one or more VNF Components (VNFCs) such as a first VNFC 462 and a second VNFC 464 through an nth VNFC 466. The VNFs may take on various functions, such as a serving gateway (SGW) or packet data network gateway (PGW), for example. A platform SLA agent 454 may run on some or all platforms 430, 474 and perform VNF provisioning, configuring and updating functions, as well as gather statistics and data from platform QoS monitoring instrumentations, including but not limited to those associated with I/O buses, storage, CPU registers and caches, and memory. The SLA agent 454 may be privileged to read and write to various PQoS parameters and registers on the platform such that it can gather data from PQoS monitoring instrumentations and write data to PQoS enforcement instrumentations.

Figure 5:
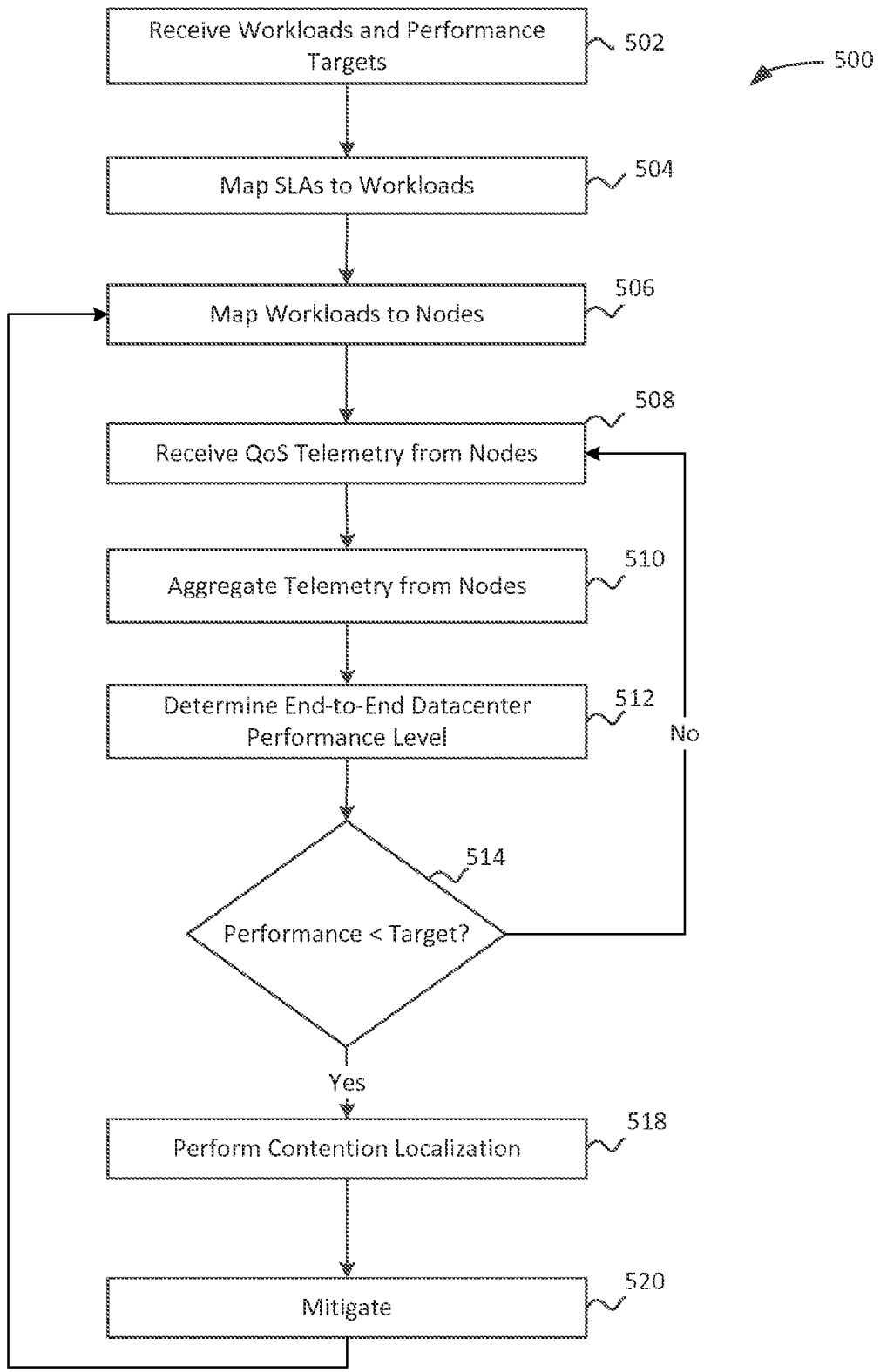
FIG. 5 is a flow diagram of an example process for end-to-end datacenter performance control.

FIG. 5 depicts an example process 500 for end-to-end datacenter performance control that may be implemented by the apparatus 100, the datacenter monitor 214, the NFV system 300, or the NFV SLA monitoring system 400 described with respect to FIGS. 1-4 in accordance with various embodiments. In various embodiments, the process 500 may be performed by the datacenter performance monitor 112, node monitor 120, node aggregation module 121, performance distribution module 122, and/or contention localization module 123. In other embodiments, the process 500 may be performed with more or less modules and/or with some operations in different order.

In embodiments, the process may include a block 502 where workloads and performance targets such as end-to-end datacenter performance targets may be received by a controller such as the datacenter performance monitor 112, the datacenter monitor 214, the SDN controller 302, or the orchestrator 406. At operation, 504, service level agreements (SLAs) may be mapped to workloads. At a block 506, workloads may be mapped to nodes such as node 104, nodes 216-224 described with respect to FIG. 2, node 304, or platforms 430 or 474 by datacenter performance monitor 112 and performance distribution module 122, for example. In embodiments, the controller may maintain a map of all datacenter resources and utilization such as cache space, memory, and network utilization. In embodiments, a per-network segment performance target such as a per-network segment latency budget may be determined at block 506. In embodiments, at operation 508, QoS telemetry from the nodes may be received such as the datacenter performance monitor 112 receiving telemetry from the QoS instrumentations 152, 154, 156, 158, 166, 168, 170, 172, and 174. In embodiments, the QoS telemetry from the nodes may include data corresponding to network segment performance levels such as a network latency over a network segment. In embodiments, a comparison of node performance levels to node performance targets or network segment performance levels to network segment performance targets may be performed. At block 510, telemetry from the nodes may be aggregated, such by the node aggregation module 121 in various embodiments. At operation 512, an end-to-end datacenter performance level may be determined.

At a decision block 514, it may be determined whether the end-to-end datacenter performance level determined is below the end-to-end datacenter performance target. If the end-to-end datacenter performance level is not below the end-to-end datacenter performance target, the process may return to the block 508. If the end-to-end datacenter performance level is below the end-to-end datacenter performance target, contention localization may be performed at block 518, such as by the contention localization module 123 sending a command to the node 104 where a node contention localization module in the node management modules 119 may perform a contention localization process and send a response back to the datacenter controller such as the datacenter performance monitor 112 or the datacenter monitor 214 in various embodiments. In embodiments, the contention localization may include sending a contention localization command to a node associated with a network segment.

In additional embodiments, it may be determined at the decision block 514 whether the end-to-end datacenter performance level determined is above the end-to-end datacenter performance target (e.g., 100,000 operations/second when the target is 50,000 operations/second). In embodiments, it may be determined at the decision block 514 whether the end-to-end datacenter performance level determined is outside of a predefined range from the end-to-end datacenter performance target (e.g., outside of target latency plus or minus 25 ms). If the end-to-end performance level is not above the end-to-end datacenter performance target or is within the predefined range for these embodiments, the process may return to the block 508. If the end-to-end performance level is above the performance target or is outside the range for these embodiments, the process may proceed to the block 518 or may optionally proceed directly to the block 520.

At operation 520, a mitigation command may be sent by a datacenter control apparatus, such as the datacenter performance monitor 112 or the datacenter monitor 214 to one or more nodes such as the node 104. In various embodiments, the mitigation command may be based at least in part on the contention localization response and may include a mitigation command selected from a group of mitigation commands that includes an instruction to provide additional memory, an instruction to provide an additional processor core, an instruction to provide additional network bandwidth, an instruction to provide additional memory bandwidth, an instruction to provide additional IO bandwidth to an underserved device, an instruction to provide additional per-thread resources using SMT QoS, and an instruction to provide additional cache space to a workload. For instance, a web server which is taking 300 ms to service requests when its budget is 250 ms may be given additional cache or CPU cores to complete the work faster on average. In embodiments, the process 500 may then return to the block 506 where workloads may be remapped to one or more nodes. In additional embodiments, where performance of a workload is being lowered, the mitigation command may include a mitigation command selected from a group of mitigation commands that includes an instruction to provide less memory, an instruction to remove a processor core, an instruction to provide less network bandwidth, an instruction to provide less memory bandwidth, an instruction to provide less IO bandwidth to an overserved device, an instruction to provide less per-thread resources using SMT QoS, and an instruction to provide less cache space to a workload.

Figure 6:
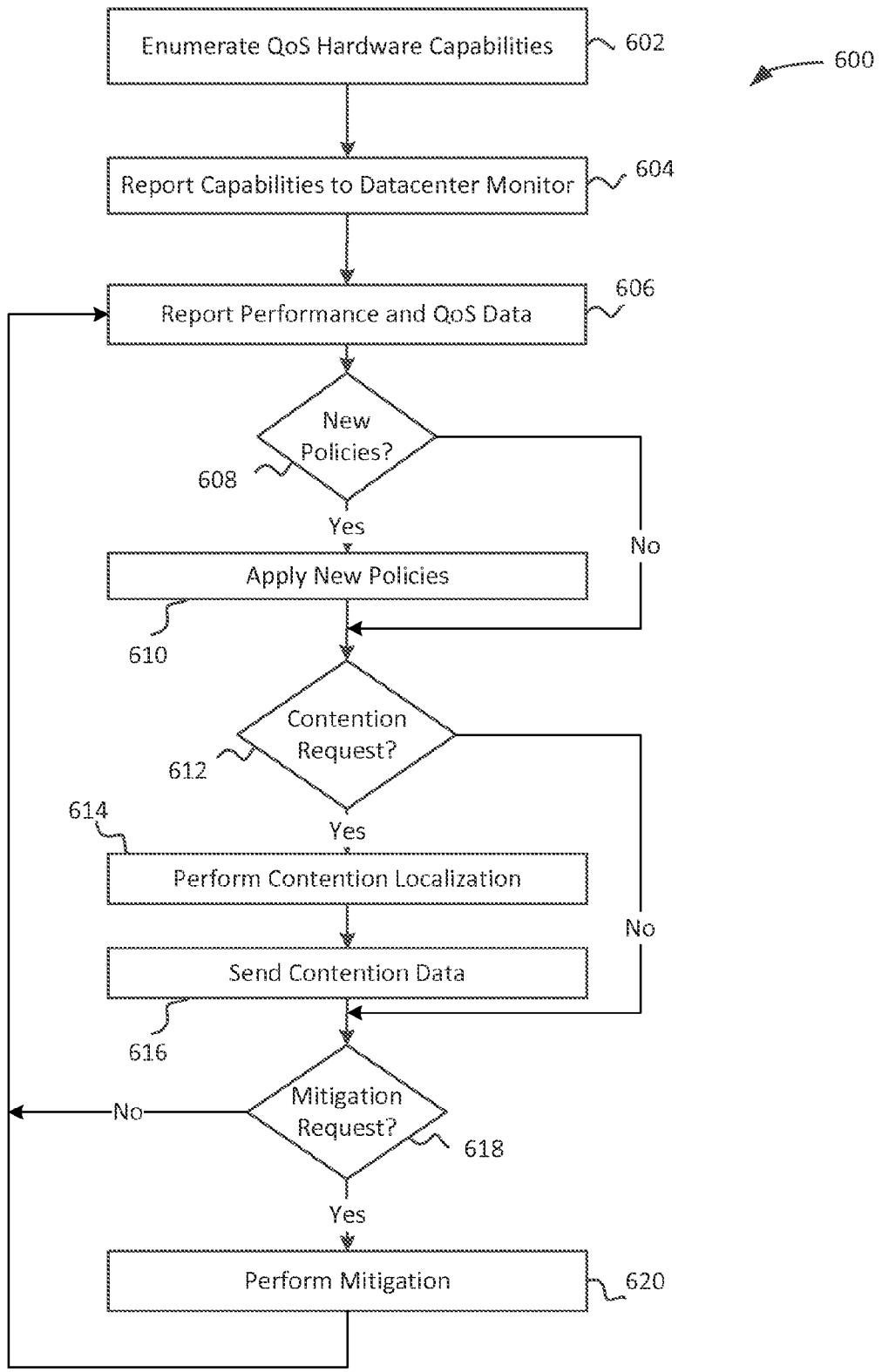
FIG. 6 is a flow diagram of an example process for end-to-end datacenter performance control node-level operations.

FIG. 6 is a flow diagram of an example process 600 for end-to-end datacenter performance control node-level operations. In embodiments, process 600 may be performed by the node management modules 119 running on the node 104 and may include multiple components that may be structured as threads. At block 602, QoS hardware capabilities, such as the various mechanisms provided by QoS monitoring and enforcement instrumentations may be enumerated, such as by node management modules 119 running on node 104, for example. The monitoring and enforcement capabilities of the SMT QoS instrumentation 152, the L2 QoS instrumentation 154, the L2 external bandwidth QoS instrumentation 156, the last-level cache QoS instrumentation 158, the interconnect QoS instrumentation 168, the IO QoS instrumentation 170, and the queue based QoS instrumentation 172 may be enumerated in embodiments, for example. At operation 604, the enumerated QoS hardware capabilities may be reported by the node to a datacenter monitor such as the datacenter performance monitor 112 or the datacenter monitor 214 in various embodiments. At block 606, telemetry, including QoS data and performance information relating to workloads running on the node may be reported to the datacenter monitor.

At a decision block 608, it may be determined whether any new policies have been received by the node from a datacenter monitor or central policy server such as the central policy server 102 or policy engine 306, for example. If, at the decision block 608, it was determined that new policies have been received, they may be applied at operation 610. If, it was determined that new policies have not been received at the decision block 608 or if new policies have been applied at the block 610, it may be determined at a decision block 612 whether a contention localization request has been received. If a contention localization request has been received, contention localization may be performed at a block 614. In embodiments, node 104 may perform contention localization that includes determining sources of contention that are most prevalent on the node. For instance, if a streaming application is co-located with a web server on the node 104, the contention localization may indicate that cache and memory bandwidth are contended, that the web server is cache-sensitive, and that a best course of action may be to restrict the cache utilization of the streaming application.

Contention localization by the node 104 may include enumerating available QoS monitoring instrumentations and measuring contention at all shared resources such as determining which threads are using the most cache space, memory bandwidth, IO, network usage, disk bandwidth, or input/output operations per second (IOPS). Contention localization may further include detecting the primary sources of contention for workloads of interest which may be the highest priority workloads that may have been identified as not meeting SLAs, latencies, or performance targets. Detecting the primary sources of contention may include checking cache or memory use per thread, application, or VM of interest and identifying threads overutilizing the cache or memory space (e.g., using >50% of cache). Detecting the primary sources of contention may further include checking IO utilization per thread, application, or VM of interest by determining disk or solid state drive (SSD) bandwidth and IOPS utilization as well as network bandwidth utilization. Detecting the primary sources of contention may further include checking other possible resources that support QoS monitoring instrumentations such as L2 cache contention or SMT thread contention. Contention localization may also include aggregating the data for the threads, applications, or VMs of interest to determine where the contention is the most severe and how cache, memory, IO, or network sensitive workloads corresponding to the threads, applications, or VMs may be. Contention localization may further include generating a summary of recommended actions to mitigate the detected contention based at least in part on the aggregated data. Contention localization data may be sent to a datacenter monitor at operation 616. The contention localization data may include the summary of recommended actions to mitigate the contention and summarized contention status data in various embodiments. In embodiments, contention localization may be performed at the block 614 and contention data may be sent at the block 616 even if it is determined that a contention request has not been received at the decision block 612. In embodiments, a check to see whether a contention request has been received, such as that described with respect to the decision block 612, may not be performed and the nodes 104 may periodically report data to a datacenter monitor or central policy server without first receiving a request.

If at the decision block 612, it was determined that a contention localization request was not received or contention data has been sent at operation 616, it may be determined whether a mitigation request has been received at a decision block 618. If a mitigation request has been received, which may be in the form of a mitigation command containing one or more instructions in various embodiments, mitigation may be performed at a block 620. In embodiments, the mitigation command may include a mitigation command selected from a group of mitigation commands that includes an instruction to provide additional memory, an instruction to provide an additional processor core, an instruction to provide additional network bandwidth, an instruction to provide additional memory bandwidth, an instruction to provide additional IO bandwidth to an underserved device, an instruction to provide additional per-thread resources using SMT QoS, and an instruction to provide additional cache space to a workload, or other instructions to use QoS enforcement mechanisms.

Mitigation by the node 104 may include enumerating available QoS enforcement instrumentations on the node, using hardware QoS instrumentations to make changes to resource allocation based at least in part on the mitigation command, and reporting back to the datacenter monitor, such as the central policy server 102 or the data center monitor 214, whether the requested mitigation operation was successful. If mitigation has been performed at block 620 or, at the decision block 618, it was determined that a mitigation request has not been received, the process 600 may return to the block 606 where updated performance and QoS data is reported to the datacenter monitor. In alternative embodiments, the datacenter monitor may send a performance target to the node, with the node making resource allocation determinations without receiving a contention request or mitigation request, with the node sending less data back to the datacenter monitor that may indicate a summary level of data, an indication of current status, and whether the performance target is being met on the node.

In various embodiments, a workload manager that may be included in the node management modules 119 may run in parallel or sequentially with the process 600 to receive workload launch requests at the node 104 from the central policy server 102, start workloads, place workloads on specific sockets or cores, migrate workloads across cores or sockets as needed, and perform actions related to VM migration across nodes such as pause, shutdown, save, and move context actions.

Figure 7:
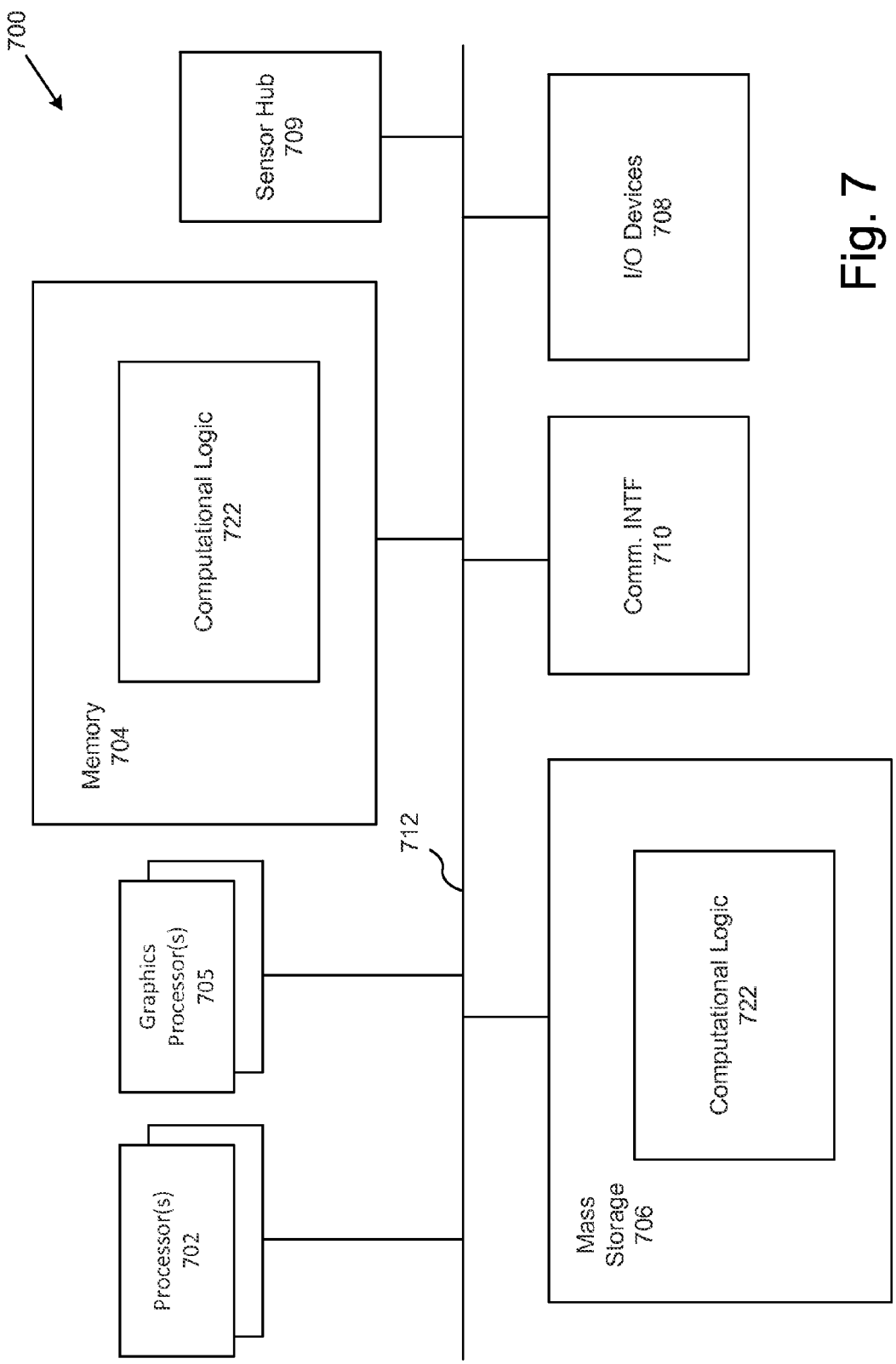
FIG. 7 illustrates an example computing environment suitable for practicing various aspects of the disclosure, in accordance with various embodiments.

Referring now to FIG. 7, an example computer 700 suitable for use to practice the present disclosure as earlier described with reference to FIGS. 1-4 is illustrated in accordance with various embodiments. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include one or more graphics processors 705, mass storage devices 706 (such as diskette, hard drive, compact disc read only memory (CD-ROM) and so forth), input/output devices 708 (such as display, keyboard, cursor control, remote control, gaming controller, image capture device, and so forth), sensor hub 709 and communication interfaces 710 (such as network interface cards, modems, infrared receivers, radio receivers (e.g., Bluetooth), and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing the operations associated with the central policy server 102; the node 104; the datacenter monitor 214; nodes 216, 218, 220, 222, or 224; SDN controller 302; policy engine 306; node 304; orchestrator 406; VIM 408; NFV Tenant 402; OSS/BSS 404; or platforms 430, 474, e.g., operations described for datacenter performance monitor 112, modules 119, 121, 122, 123, 124, and 126 shown in FIG. 1, or operations shown in process 500 of FIG. 5 or process 600 of FIG. 6, collectively denoted as computational logic 722. The system memory 704 and mass storage devices 706 may also be employed to store a working copy and a permanent copy of the programming instructions implementing the operations associated with the workloads 142, 144; the VMs 314, 318, 322, 332, 336, 340; or the VNFs 312, 316, 320, 330, 334, 338, 462, 464, 466, 470 shown in FIGS. 3-4 in various embodiments. The various elements may be implemented by assembler instructions or bytecode supported by processor(s) 702 or high-level languages, such as, for example, C, that can be compiled or interpreted into such instructions.

The permanent copy of the programming instructions may be placed into mass storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 702-712 may vary, depending on whether computer 700 is a stationary computing device, such as a server, orchestrator, set-top box or desktop computer, or a mobile computing device such as a tablet computing device, laptop computer or smartphone. Their constitutions are otherwise known, and accordingly will not be further described.

Figure 8:
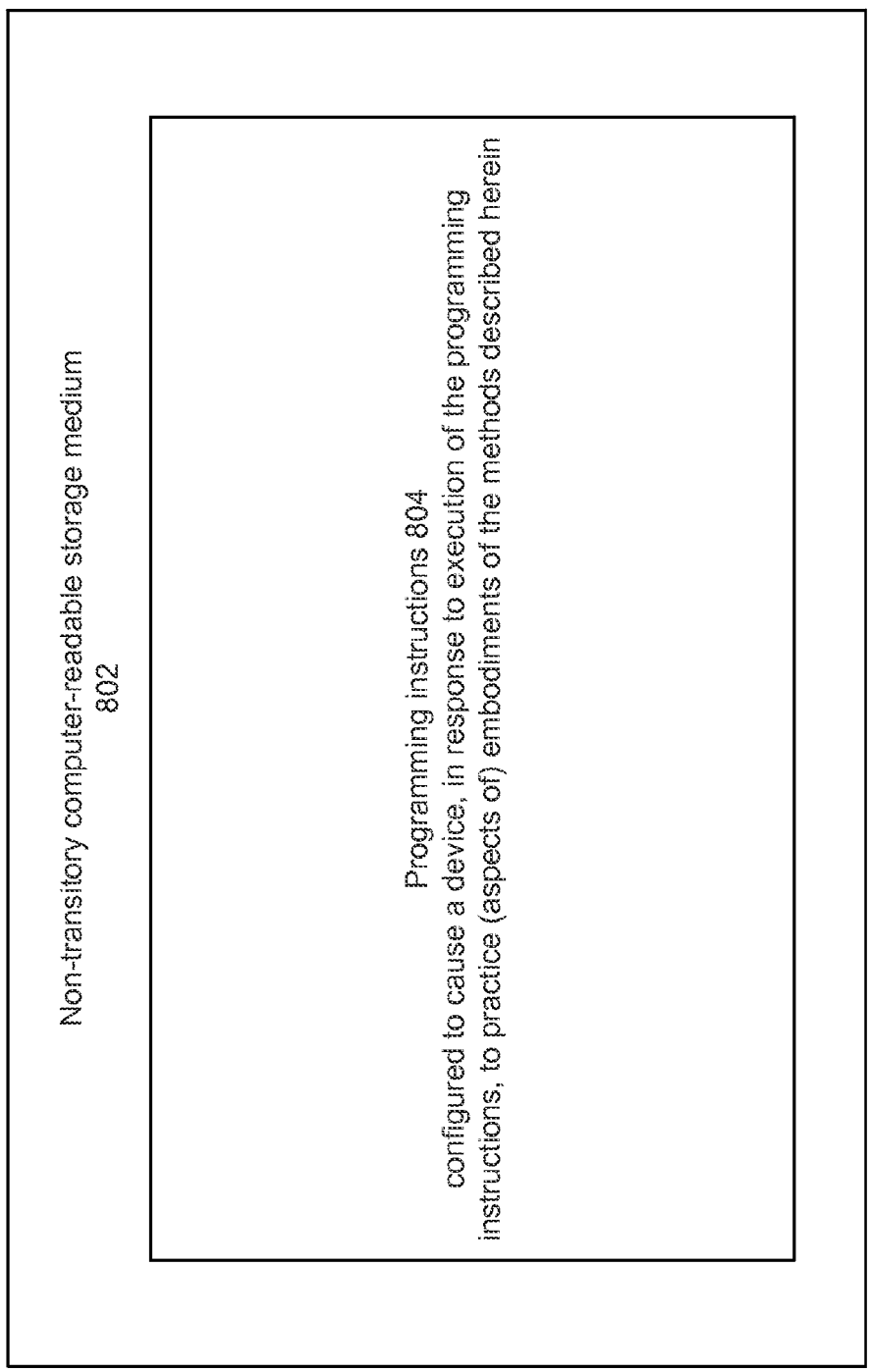
FIG. 8 illustrates an example storage medium with instructions configured to enable an apparatus to practice various aspects of the present disclosure, in accordance with various embodiments.

FIG. 8 illustrates an example at least one non-transitory computer-readable storage medium 802 having instructions configured to practice all or selected ones of the operations associated with the central policy server 102; the node 104; the datacenter monitor 214; nodes 216, 218, 220, 222, or 224; SDN controller 302; policy engine 306; node 304; orchestrator 406; VIM 408; NFV Tenant 402; OSS/BSS 404; or platforms 430, 474, earlier described, in accordance with various embodiments. As illustrated, at least one computer-readable storage medium 802 may include a number of programming instructions 804. The storage medium 802 may represent a broad range of persistent storage medium known in the art, including but not limited to flash memory, dynamic random access memory, static random access memory, an optical disk, a magnetic disk, etc. Programming instructions 804 may be configured to enable a device, e.g., computer 700, central policy server 102; the node 104; the datacenter monitor 214; nodes 216, 218, 220, 222, or 224; SDN controller 302; policy engine 306; node 304; orchestrator 406; VIM 408; NFV Tenant 402; OSS/BSS 404; or platforms 430, 474, in response to execution of the programming instructions, to perform, e.g., but not limited to, various operations described for datacenter performance monitor 112; modules 119, 121, 122, 123, 124, and 126 shown in FIG. 1; operations of process 500 of FIG. 5 or process 600 of FIG. 6; workloads 142, 144; the VMs 314, 318, 322, 332, 336, 340; or the VNFs 312, 316, 320, 330, 334, 338, 462, 464, 466, 470 shown in FIGS. 3-4 in various embodiments. In alternate embodiments, programming instructions 804 may be disposed on multiple computer-readable storage media 802. In still other embodiments, computer-readable storage media 802 may be transitory, such as a signal.

Referring back to FIG. 7, for an embodiment, at least one of processors 702 may be packaged together with memory having computational logic 722 configured to practice aspects described for datacenter performance monitor 112; modules 119, 121, 122, 123, 124, and 126 shown in FIG. 1; operations of process 500 or FIG. 5 or process 600 of FIG. 6; workloads 142, 144; the VMs 314, 318, 322, 332, 336, 340; or the VNFs 312, 316, 320, 330, 334, 338, 462, 464, 466, 470 shown in FIGS. 3-4. For an embodiment, at least one of processors 702 may be packaged together with memory having computational logic 722 configured to practice aspects described for datacenter performance monitor 112; modules 119, 121, 122, 123, 124, and 126 shown in FIG. 1; operations of process 500 of FIG. 5 or process 600 of FIG. 6; workloads 142, 144; the VMs 314, 318, 322, 332, 336, 340; or the VNFs 312, 316, 320, 330, 334, 338, 462, 464, 466, 470 shown in FIGS. 3-4 to form a System in Package (SiP). For an embodiment, at least one of processors 702 may be integrated on the same die with memory having computational logic 722 configured to practice aspects described datacenter performance monitor 112; modules 119, 121, 122, 123, 124, and 126 shown in FIG. 1; operations of process 500 of FIG. 5 or process 600 of FIG. 6; workloads 142, 144; the VMs 314, 318, 322, 332, 336, 340; or the VNFs 312, 316, 320, 330, 334, 338, 462, 464, 466, 470 shown in FIGS. 3-4. For an embodiment, at least one of processors 702 may be packaged together with memory having computational logic 722 configured to practice aspects of process 500 of FIG. 5 or process 600 of FIG. 6 to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include an apparatus for controlling computing, comprising: one or more processors; a memory coupled with the one or more processors; a datacenter performance monitor to receive a datacenter performance target corresponding to a service level agreement, determine an end-to-end datacenter performance level based at least in part on quality of service data collected for a plurality of nodes of the datacenter by one or more quality of service monitoring hardware instrumentations associated with the one or more nodes, and compare the end-to-end datacenter performance level determined to the datacenter performance target received; and a mitigation module operated by the one or more processors to send a mitigation command based at least in part on a result of the comparison of the end-to-end datacenter performance level to the datacenter performance target, wherein the mitigation command is sent to one or more quality of service enforcement hardware instrumentations on one or more of the nodes.

Example 2 may include the subject matter of Example 1, further comprising a contention localization module operated by the one or more processors to send a contention localization command in response to the comparison of the end-to-end datacenter performance level to the datacenter performance target, wherein the contention localization module is also operated by the one or more processors to receive a contention localization response, and wherein the mitigation command is also based at least in part on the contention localization response.

Example 3 may include the subject matter of Example 2, further comprising a performance distribution module operated by the one or more processors to determine a node performance target for each of the plurality of nodes based at least in part on the datacenter performance target, wherein the datacenter monitor is to determine a node performance level for each of the plurality of nodes based at least in part on one or more quality of service monitoring hardware instrumentations associated with the nodes, and compare each node performance level determined to its corresponding node performance target, wherein the contention localization module is to send a contention localization command to each node with a node performance level determined to be below its corresponding node performance target and receive a contention localization response from each node to which a contention localization command was sent, and wherein the mitigation module is to send a node mitigation command to at least one of the nodes from which a contention localization response was received.

Example 4 may include the subject matter of any one of Examples 1-2, wherein the mitigation module is to send a mitigation command in response to the end-to-end datacenter performance level determined to be above the datacenter performance target.

Example 5 may include the subject matter of Example 1, wherein the datacenter performance monitor is to receive a plurality of datacenter performance targets corresponding to a plurality of service level agreements, determine a plurality of end-to-end datacenter performance levels corresponding to each of the plurality of datacenter performance targets based at least in part on quality of service data collected by one or more quality of service monitoring hardware instrumentations, and compare each of the end-to-end datacenter performance levels determined to the corresponding datacenter performance targets, wherein the mitigation module is to send a mitigation command to a node running a workload corresponding to an end-to-end datacenter performance level determined to be less than its corresponding datacenter performance target, and wherein the mitigation module is to send at least one mitigation command selected from a group of mitigation commands that includes an instruction to provide additional memory, an instruction to provide an additional processor core, an instruction to provide additional network bandwidth, an instruction to provide additional memory bandwidth, an instruction to provide additional IO bandwidth to an underserved device, an instruction to provide additional per-thread resources using SMT QoS, and an instruction to provide additional cache space, to the workload.

Example 6 may include the subject matter of any one of Examples 1-5, wherein the datacenter performance monitor comprises: a node monitor to monitor performance levels of the plurality of nodes; and a node aggregation module operated by the one or more processors to aggregate the performance levels of the plurality of nodes to determine an aggregated performance level, wherein the datacenter performance module is to determine the end-to-end datacenter performance level based at least in part on the aggregated datacenter performance level.

Example 7 may include the subject matter of Example 6, wherein the one or more quality of service monitoring hardware instrumentations and the one or more quality of service enforcement hardware instrumentations each include at least one of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism.

Example 8 may include the subject matter of any one of Examples 1-6, wherein the one or more quality of service monitoring hardware instrumentations and the one or more quality of service enforcement hardware instrumentations each include at least one of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism.

Example 9 may include a method for controlling computing, comprising: receiving, by an apparatus for computing, a datacenter performance target; determining, by the apparatus, an end-to-end datacenter performance level based at least in part on quality of service data collected from a plurality of nodes of the datacenter by one or more quality of service monitoring hardware instrumentations associated with the one or more nodes; comparing, by the apparatus, the end-to-end datacenter performance level determined to the datacenter performance target; and sending a mitigation command, by the apparatus, based at least in part on a result of the comparison of the end-to-end datacenter performance level to the datacenter performance target, wherein the mitigation command is sent to one or more quality of service enforcement hardware instrumentations on one or more of the nodes.

Example 10 may include the subject matter of Example 9, further comprising: sending a contention localization command, by the apparatus, in response to the end-to-end datacenter performance level determined to be below the datacenter performance target; and receiving a contention localization response, by the apparatus, wherein sending the mitigation command is also based at least in part on the contention localization response.

Example 11 may include the subject matter of Example 10, further comprising: determining, by the apparatus, a node performance target for each of the plurality of nodes based at least in part on the datacenter performance target, wherein determining, by the apparatus, an end-to-end datacenter performance level comprises determining a node performance level for each of the plurality of nodes based at least in part on quality of service data collected by one or more quality of service monitoring hardware instrumentations and comparing each node performance level determined to its corresponding node performance target, wherein sending, by the apparatus, a contention localization command comprises sending a contention localization command to each node with a performance level determined to be below its corresponding node performance target, and wherein receiving a contention localization response, by the apparatus, comprises receiving a contention localization response from each node to which a contention localization command was sent, and wherein sending a mitigation command, by the apparatus, comprises sending a node mitigation command to at least one of the nodes from which a contention localization response was received.

Example 12 may include the subject matter of Example 9, wherein sending, by the apparatus, a mitigation command comprises sending a mitigation command in response to the end-to-end datacenter performance level determined to be above the datacenter performance target.

Example 13 may include the subject matter of Example 9, wherein receiving, by the apparatus, a datacenter performance target comprises receiving a plurality of datacenter performance targets corresponding to a plurality of service level agreements, wherein determining, by the apparatus, an end-to-end datacenter performance level comprises determining a plurality of end-to-end datacenter performance levels corresponding to each of the plurality of datacenter performance targets based at least in part on quality of service data collected by one or more quality of service monitoring hardware instrumentations, and wherein comparing, by the apparatus, comprises comparing each of the end-to-end datacenter performance levels determined to the corresponding datacenter performance targets, and wherein sending a mitigation command, by the apparatus, comprises sending a mitigation command to a node running a workload corresponding to an end-to-end datacenter performance level determined to be less than its corresponding datacenter performance target, and wherein sending a mitigation command, by the apparatus, comprises sending at least one mitigation command selected from a group of mitigation commands that includes an instruction to provide additional memory, an instruction to provide an additional processor core, an instruction to provide additional network bandwidth, an instruction to provide additional memory bandwidth, an instruction to provide additional IO bandwidth to an underserved device, an instruction to provide additional per-thread resources using SMT QoS, and an instruction to provide additional cache space, to the workload.

Example 14 may include the subject matter of any one of Examples 9-13, wherein determining, by the apparatus, an end-to-end datacenter performance level comprises: determining performance levels of the plurality of nodes; and aggregating the performance levels of the plurality of nodes to determine an aggregated performance level, wherein determining, by the apparatus, the end-to-end performance level is also based at least in part on the aggregated performance level.

Example 15 may include the subject matter of Example 14, wherein determining, by the apparatus, an end-to-end datacenter performance level comprises determining an end-to-end datacenter performance level based at least in part on quality of service data collected by one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism; and wherein sending a mitigation command, by the apparatus, comprises sending a mitigation command based at least in part on one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism, in response to the end-to-end datacenter performance level determined to be below the datacenter performance target.

Example 16 may include the subject matter of any one of Examples 9-13, wherein determining, by the apparatus, an end-to-end datacenter performance level comprises determining an end-to-end datacenter performance level based at least in part on quality of service data collected by one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism; and wherein sending a mitigation command, by the apparatus, comprises sending a mitigation command based at least in part on one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism, in response to the end-to-end datacenter performance level determined to be below the datacenter performance target.

Example 17 may include at least one non-transitory computer-readable medium comprising instructions stored thereon that, in response to execution of the instructions by an apparatus for computing, cause the apparatus to: receive a datacenter performance target at a datacenter performance monitor; determine an end-to-end datacenter performance level based at least in part on quality of service data collected from a plurality of nodes of the datacenter by one or more quality of service monitoring hardware instrumentations associated with the one or more nodes; compare the end-to-end datacenter performance level determined to the datacenter performance target; and send a mitigation command based at least in part on a result of the comparison of the end-to-end datacenter performance level to the datacenter performance target, wherein the mitigation command is sent to one or more quality of service enforcement hardware instrumentations on one or more of the nodes.

Example 18 may include the subject matter of Example 17, wherein the apparatus is further caused to: send a contention localization command in response to the end-to-end datacenter performance level determined to be below the datacenter performance target; and receive a contention localization response, wherein the apparatus is caused to send the mitigation command based at least in part on the contention localization response.

Example 19 may include the subject matter of Example 18, wherein the apparatus is further caused to: determine a node performance target for each of the plurality of nodes based at least in part on the datacenter performance target; determine a node performance level for each of the plurality of nodes based at least in part on quality of service data collected by one or more quality of service monitoring hardware instrumentations and compare each node performance level determined to its corresponding node performance target; send a contention localization command to each node with a performance level determined to be below its corresponding node performance target; receive a contention localization response from each node to which a contention localization command was sent; and send a mitigation command to at least one of the nodes from which a contention localization response was received.

Example 20 may include the subject matter of Example 17, wherein the apparatus is caused to send a mitigation command in response to the end-to-end datacenter performance level determined to be above the datacenter performance target.

Example 21 may include the subject matter of Example 17, wherein the apparatus is further caused to: receive a plurality of datacenter performance targets corresponding to a plurality of service level agreements; determine a plurality of end-to-end datacenter performance levels corresponding to each of the plurality of datacenter performance targets based at least in part on quality of service data collected by one or more quality of service monitoring hardware instrumentations; compare each of the end-to-end datacenter performance levels determined to the corresponding datacenter performance targets; send a mitigation command to a node running a workload corresponding to an end-to-end datacenter performance level determined to be less than its corresponding datacenter performance target; and send at least one mitigation command selected from a group of mitigation commands that includes an instruction to provide additional memory, an instruction to provide an additional processor core, an instruction to provide additional network bandwidth, an instruction to provide additional memory bandwidth, an instruction to provide additional IO bandwidth to an underserved device, an instruction to provide additional per-thread resources using SMT QoS, and an instruction to provide additional cache space, to the workload.

Example 22 may include the subject matter of any one of Examples 17-21, wherein the apparatus is further caused to: determine performance levels of the plurality of nodes; aggregate the performance levels of the plurality of nodes to determine an aggregated performance level; and determine the end-to-end datacenter performance level based at least in part on the aggregated performance level.

Example 23 may include the subject matter of Example 22, wherein the apparatus is further caused to: determine the end-to-end datacenter performance level based at least in part on quality of service data collected by one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism; and send a mitigation command based at least in part on one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism, in response to the end-to-end datacenter performance level determined to be below the datacenter performance target.

Example 24 may include the subject matter of any one of Examples 17-21, wherein the apparatus is further caused to: determine the end-to-end datacenter performance level based at least in part on quality of service data collected by one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism; and send a mitigation command based at least in part on one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism, in response to the end-to-end datacenter performance level determined to be below the datacenter performance target.

Example 25 may include the subject matter of Example 17, wherein the apparatus is further caused to: determine a per-network segment performance target for each of a plurality of network segments based at least in part on the datacenter performance target; determine a network segment performance level for each of the plurality of network segments based at least in part on quality of service data collected by one or more quality of service monitoring hardware instrumentations; compare each network segment performance level determined to its corresponding network segment performance budget; send a contention localization command to a node associated with a network segment based at least in part on the comparison of the network segment performance level determined to its corresponding network segment performance budget; receive a contention localization response from the node to which a contention localization command was sent; and send a mitigation command to the node from which the contention localization response was received.

Example 26 may include an apparatus for controlling computing, comprising: means for receiving a datacenter performance target; means for determining an end-to-end datacenter performance level based at least in part on quality of service data collected from a plurality of nodes of the datacenter by one or more quality of service monitoring hardware instrumentations associated with the one or more nodes; means for comparing the end-to-end datacenter performance level determined to the datacenter performance target; and means for sending a mitigation command based at least in part on a result of the comparison of the end-to-end datacenter performance level to the datacenter performance target, wherein the mitigation command is sent to one or more quality of service enforcement hardware instrumentations on one or more of the nodes.

Example 27 may include the subject matter of Example 26, further comprising: means for sending a contention localization command in response to the end-to-end datacenter performance level determined to be below the datacenter performance target; and means for receiving a contention localization response wherein the means for sending the mitigation command also sends the mitigation command based at least in part on the contention localization response.

Example 28 may include the subject matter of Example 27, further comprising: means for determining a node performance target for each of the plurality of nodes based at least in part on the datacenter performance target, wherein the means for determining an end-to-end datacenter performance level comprises means for determining a node performance level for each of the plurality of nodes based at least in part on quality of service data collected by one or more quality of service monitoring hardware instrumentations and means for comparing each node performance level determined to its corresponding node performance target, wherein the means for sending a contention localization command comprises means for sending a contention localization command to each node with a performance level determined to be below its corresponding node performance target, and wherein the means for receiving a contention localization response comprises means for receiving a contention localization response from each node to which a contention localization command was sent, and wherein the means for sending a mitigation command comprises means for sending a node mitigation command to at least one of the nodes from which a contention localization response was received.

Example 29 may include the subject matter of Example 26, wherein the means for sending a mitigation command comprises means for sending a mitigation command in response to the end-to-end datacenter performance level determined to be above the datacenter performance target.

Example 30 may include the subject matter of Example 26, wherein the means for receiving a datacenter performance target comprises means for receiving a plurality of datacenter performance targets corresponding to a plurality of service level agreements, wherein the means for determining an end-to-end datacenter performance level comprises means for determining a plurality of end-to-end datacenter performance levels corresponding to each of the plurality of datacenter performance targets based at least in part on quality of service data collected by one or more quality of service monitoring hardware instrumentations, and wherein the means for comparing comprises means for comparing each of the end-to-end datacenter performance levels determined to the corresponding datacenter performance targets, and wherein the means for sending a mitigation command comprises means for sending a mitigation command to a node running a workload corresponding to an end-to-end datacenter performance level determined to be less than its corresponding datacenter performance target, and wherein the means for sending a mitigation command comprises means for sending at least one mitigation command selected from a group of mitigation commands that includes an instruction to provide additional memory, an instruction to provide an additional processor core, an instruction to provide additional network bandwidth, an instruction to provide additional memory bandwidth, an instruction to provide additional IO bandwidth to an underserved device, an instruction to provide additional per-thread resources using SMT QoS, and an instruction to provide additional cache space, to the workload.

Example 31 may include the subject matter of any one of Examples 26-30, wherein the means for determining an end-to-end datacenter performance level comprises: means for determining performance levels of the plurality of nodes; and means for aggregating the performance levels of the plurality of nodes to determine an aggregated performance level, wherein the means for determining the end-to-end performance level determines the end-to-end performance level also based at least in part on the aggregated performance level.

Example 32 may include the subject matter of Example 31, wherein the means for sending a mitigation command comprises means for sending at least one mitigation command selected from a group of mitigation commands that includes an instruction to provide additional memory, an instruction to provide an additional processor core, an instruction to provide additional network bandwidth, an instruction to provide additional memory bandwidth, an instruction to provide additional IO bandwidth to an underserved device, an instruction to provide additional per-thread resources using SMT QoS, and an instruction to provide additional cache space to the workload, and wherein the means for determining an end-to-end datacenter performance level comprises means for determining an end-to-end datacenter performance level based at least in part on quality of service data collected by one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism; and wherein the means for sending a mitigation command comprises means for sending a mitigation command based at least in part on one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism, in response to the end-to-end datacenter performance level determined to be below the datacenter performance target.

Example 33 may include the subject matter of any one of Examples 26-30, wherein the means for determining an end-to-end datacenter performance level comprises means for determining an end-to-end datacenter performance level based at least in part on quality of service data collected by one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism; and wherein the means for sending a mitigation command comprises means for sending a mitigation command based at least in part on one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism, in response to the end-to-end datacenter performance level determined to be below the datacenter performance target.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for controlling computing, comprising:
   one or more processors;
   a memory coupled with the one or more processors;
   a datacenter performance monitor operated by the one or more processors to determine an end-to-end datacenter performance level from an ingress point of a datacenter to an egress point of the datacenter based at least in part on quality of service data collected for a plurality of nodes of the datacenter by one or more quality of service monitoring hardware instrumentations associated with the plurality of nodes, and compare the end-to-end datacenter performance level determined to a datacenter performance target; and
   a mitigation module operated by the one or more processors to send a mitigation command based at least in part on a result of the comparison of the end-to-end datacenter performance level to the datacenter performance target, wherein the mitigation command is sent to one or more quality of service enforcement hardware instrumentations on one or more of the nodes, wherein the ingress point is a first network interface and the egress point is a second network interface.

2. The apparatus of claim 1, further comprising a contention localization module operated by the one or more processors to send a contention localization command in response to the comparison of the end-to-end datacenter performance level to the datacenter performance target, wherein the contention localization module is also operated by the one or more processors to receive a contention localization response, and wherein the mitigation command is also based at least in part on the contention localization response.

3. The apparatus of claim 2, further comprising a performance distribution module operated by the one or more processors to determine a node performance target for each of the plurality of nodes based at least in part on the datacenter performance target, wherein the datacenter performance monitor is to determine a node performance level for each of the plurality of nodes based at least in part on one or more quality of service monitoring hardware instrumentations associated with the nodes, and compare each node performance level determined to its corresponding node performance target, wherein the contention localization module is to send a contention localization command to each node with a node performance level determined to be below its corresponding node performance target and receive a contention localization response from each node to which a contention localization command was sent, and wherein the mitigation module is to send a node mitigation command to at least one of the nodes from which a contention localization response was received.

4. The apparatus of claim 1, wherein the mitigation module is to send a mitigation command in response to the end-to-end datacenter performance level determined to be above the datacenter performance target.

5. The apparatus of claim 1, wherein the datacenter performance monitor is to determine a plurality of end-to-end datacenter performance levels corresponding to each of a plurality of datacenter performance targets based at least in part on quality of service data collected by one or more quality of service monitoring hardware instrumentations, and compare each of the end-to-end datacenter performance levels determined to the corresponding datacenter performance targets, wherein the mitigation module is to send a mitigation command to a node running a workload corresponding to an end-to-end datacenter performance level determined to be less than its corresponding datacenter performance target, and wherein the mitigation module is to send at least one mitigation command selected from a group of mitigation commands that includes an instruction to provide additional memory, an instruction to provide an additional processor core, an instruction to provide additional network bandwidth, an instruction to provide additional memory bandwidth, an instruction to provide additional input/output (IO) bandwidth to an underserved device, an instruction to provide additional per-thread resources using simultaneous multithreading (SMT) quality of service (QoS), and an instruction to provide additional cache space, to the workload.

6. The apparatus of claim 5, wherein the datacenter performance monitor comprises:
   a node monitor to monitor performance levels of the plurality of nodes; and
   a node aggregation module operated by the one or more processors to aggregate the performance levels of the plurality of nodes to determine an aggregated performance level,
   wherein the datacenter performance monitor is to determine the end-to-end datacenter performance level based at least in part on the aggregated performance level.

7. The apparatus of claim 6, wherein the one or more quality of service monitoring hardware instrumentations and the one or more quality of service enforcement hardware instrumentations each include at least one of a simultaneous multithreading quality of service mechanism, a level 2 (L2) cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism.

8. The apparatus of claim 1, wherein the one or more quality of service monitoring hardware instrumentations and the one or more quality of service enforcement hardware instrumentations each include at least one of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism.

9. A method for controlling computing, comprising:
determining, by an apparatus for computing, an end-to-end datacenter performance level from an ingress point of a datacenter to an egress point of the datacenter based at least in part on quality of service data collected from a plurality of nodes of the datacenter by one or more quality of service monitoring hardware instrumentations associated with the plurality of nodes;
comparing, by the apparatus, the end-to-end datacenter performance level determined to a datacenter performance target; and
sending a mitigation command, by the apparatus, based at least in part on a result of the comparison of the end-to-end datacenter performance level to the datacenter performance target, wherein the mitigation command is sent to one or more quality of service enforcement hardware instrumentations on one or more of the nodes, wherein the ingress point is a first network interface and the egress point is a second network interface.

10. The method of claim 9, further comprising:
sending a contention localization command, by the apparatus, in response to the end-to-end datacenter performance level determined to be below the datacenter performance target; and
receiving a contention localization response, by the apparatus, wherein sending the mitigation command is also based at least in part on the contention localization response.

11. The method of claim 10, further comprising:
determining, by the apparatus, a node performance target for each of the plurality of nodes based at least in part on the datacenter performance target, wherein determining, by the apparatus, an end-to-end datacenter performance level comprises determining a node performance level for each of the plurality of nodes based at least in part on quality of service data collected by one or more quality of service monitoring hardware instrumentations and comparing each node performance level determined to its corresponding node performance target, wherein sending, by the apparatus, a contention localization command comprises sending a contention localization command to each node with a performance level determined to be below its corresponding node performance target, and wherein receiving a contention localization response, by the apparatus, comprises receiving a contention localization response from each node to which a contention localization command was sent, and wherein sending a mitigation command, by the apparatus, comprises sending a node mitigation command to at least one of the nodes from which a contention localization response was received.

12. The method of claim 9, wherein sending, by the apparatus, a mitigation command comprises sending a mitigation command in response to the end-to-end datacenter performance level determined to be above the datacenter performance target.

13. The method of claim 9, wherein determining, by the apparatus, an end-to-end datacenter performance level comprises determining a plurality of end-to-end datacenter performance levels corresponding to each of a plurality of datacenter performance targets based at least in part on quality of service data collected by one or more quality of service monitoring hardware instrumentations, and wherein comparing, by the apparatus, comprises comparing each of the end-to-end datacenter performance levels determined to the corresponding datacenter performance targets, and wherein sending a mitigation command, by the apparatus, comprises sending a mitigation command to a node running a workload corresponding to an end-to-end datacenter performance level determined to be less than its corresponding datacenter performance target, and wherein sending a mitigation command, by the apparatus, comprises sending at least one mitigation command selected from a group of mitigation commands that includes an instruction to provide additional memory, an instruction to provide an additional processor core, an instruction to provide additional network bandwidth, an instruction to provide additional memory bandwidth, an instruction to provide additional input/output (IO) bandwidth to an underserved device, an instruction to provide additional per-thread resources using simultaneous multithreading (SMT) quality of service (QoS), and an instruction to provide additional cache space, to the workload.

14. The method of claim 13, wherein determining, by the apparatus, an end-to-end datacenter performance level comprises:
determining performance levels of the plurality of nodes; and
aggregating the performance levels of the plurality of nodes to determine an aggregated performance level, wherein determining, by the apparatus, the end-to-end datacenter performance level is also based at least in part on the aggregated performance level.

15. The method of claim 14, wherein determining, by the apparatus, an end-to-end datacenter performance level comprises determining an end-to-end datacenter performance level based at least in part on quality of service data collected by one or more of a simultaneous multithreading quality of service mechanism, a level 2 (L2) cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism; and wherein sending a mitigation command, by the apparatus, comprises sending a mitigation command based at least in part on one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism, in response to the end-to-end datacenter performance level determined to be below the datacenter performance target.

16. The method of claim 9, wherein determining, by the apparatus, an end-to-end datacenter performance level comprises determining an end-to-end datacenter performance level based at least in part on quality of service data collected by one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism; and wherein sending a mitigation command, by the apparatus, comprises sending a mitigation command based at least in part on one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism, in response to the end-to-end datacenter performance level determined to be below the datacenter performance target.

17. At least one non-transitory computer-readable medium comprising instructions stored thereon that, in response to execution of the instructions by an apparatus for computing, cause the apparatus to:
   determine an end-to-end datacenter performance level from an ingress point of a datacenter to an egress point of the datacenter based at least in part on quality of service data collected from a plurality of nodes of the datacenter by one or more quality of service monitoring hardware instrumentations associated with the plurality of nodes;
   compare the end-to-end datacenter performance level determined to a datacenter performance target; and
   send a mitigation command based at least in part on a result of the comparison of the end-to-end datacenter performance level to the datacenter performance target, wherein the mitigation command is sent to one or more quality of service enforcement hardware instrumentations on one or more of the nodes, wherein the ingress point is a first network interface and the egress point is a second network interface.

18. The at least one non-transitory computer-readable medium of claim 17, wherein the apparatus is further caused to:
   send a contention localization command in response to the end-to-end datacenter performance level determined to be below the datacenter performance target; and
   receive a contention localization response, wherein the apparatus is caused to send the mitigation command based at least in part on the contention localization response.

19. The at least one non-transitory computer-readable medium of claim 18, wherein the apparatus is further caused to:
   determine a node performance target for each of the plurality of nodes based at least in part on the datacenter performance target;
   determine a node performance level for each of the plurality of nodes based at least in part on quality of service data collected by one or more quality of service monitoring hardware instrumentations and compare each node performance level determined to its corresponding node performance target;
   send a contention localization command to each node with a performance level determined to be below its corresponding node performance target;
   receive a contention localization response from each node to which a contention localization command was sent; and
   send a mitigation command to at least one of the nodes from which a contention localization response was received.

20. The at least one non-transitory computer-readable medium of claim 17, wherein the apparatus is caused to send a mitigation command in response to the end-to-end datacenter performance level determined to be above the datacenter performance target.

21. The at least one non-transitory computer-readable medium of claim 17, wherein the apparatus is further caused to:
   determine a plurality of end-to-end datacenter performance levels corresponding to each of a plurality of datacenter performance targets based at least in part on quality of service data collected by one or more quality of service monitoring hardware instrumentations;
   compare each of the end-to-end datacenter performance levels determined to the corresponding datacenter performance targets;
   send a mitigation command to a node running a workload corresponding to an end-to-end datacenter performance level determined to be less than its corresponding datacenter performance target; and
   send at least one mitigation command selected from a group of mitigation commands that includes an instruction to provide additional memory, an instruction to provide an additional processor core, an instruction to provide additional network bandwidth, an instruction to provide additional memory bandwidth, an instruction to provide additional input/output (IO) bandwidth to an underserved device, an instruction to provide additional per-thread resources using simultaneous multithreading (SMT) quality of service (QoS), and an instruction to provide additional cache space, to the workload.

22. The at least one non-transitory computer-readable medium of claim 21, wherein the apparatus is further caused to:
   determine performance levels of the plurality of nodes;
   aggregate the performance levels of the plurality of nodes to determine an aggregated performance level; and
   determine the end-to-end datacenter performance level based at least in part on the aggregated performance level.

23. The at least one non-transitory computer-readable medium of claim 22, wherein the apparatus is further caused to:
   determine the end-to-end datacenter performance level based at least in part on quality of service data collected by one or more of a simultaneous multithreading quality of service mechanism, a level 2 (L2) cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism; and
   send a mitigation command based at least in part on one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism, in response to the end-to-end datacenter performance level determined to be below the datacenter performance target.

24. The at least one non-transitory computer-readable medium of claim 17, wherein the apparatus is further caused to:
   determine the end-to-end datacenter performance level based at least in part on quality of service data collected by one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism; and send a mitigation command based at least in part on one or more of a simultaneous multithreading quality of service mechanism, an L2 cache quality of service mechanism, an L2 external bandwidth quality of service mechanism, an interconnect quality of service mechanism, a memory bandwidth quality of service mechanism, an input/output quality of service mechanism, a last-level cache quality of service mechanism, or a network quality of service mechanism, in response to the end-to-end datacenter performance level determined to be below the datacenter performance target.

25. The at least one non-transitory computer-readable medium of claim 17, wherein the apparatus is further caused to:

determine a per-network segment performance target for each of a plurality of network segments based at least in part on the datacenter performance target;

determine a network segment performance level for each of the plurality of network segments based at least in part on quality of service data collected by one or more quality of service monitoring hardware instrumentations;

compare each network segment performance level determined to its corresponding network segment performance budget;

send a contention localization command to a node associated with a network segment based at least in part on the comparison of the network segment performance level determined to its corresponding network segment performance budget;

receive a contention localization response from the node to which a contention localization command was sent; and send a mitigation command to the node from which the contention localization response was received.

\* \* \* \* \*